US012794041B2

(12) United States Patent
Liu et al.

(10) Patent No.: US 12,794,041 B2
(45) Date of Patent: Nov. 10, 2026

(54) BATTERY WITH COMPLEMENTARY-SHAPED BATTERY CELLS AND CENTRAL COOLING TUNNEL

(71) Applicant: GM GLOBAL TECHNOLOGY OPERATIONS LLC, Detroit, MI (US)

(72) Inventors: Jingyuan Liu, Shanghai (CN); Sherman H. Zeng, Troy, MI (US); Haijing Liu, Shanghai (CN); John Christian Kalil, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 707 days.

(21) Appl. No.: 18/123,461

(22) Filed: Mar. 20, 2023

(65) Prior Publication Data

US 2024/0072331 A1 Feb. 29, 2024

(30) Foreign Application Priority Data

Aug. 23, 2022 (CN) ......................... 202211013443.5

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 50/209* (2021.01); *H01M 50/507* (2021.01); *H01M 50/533* (2021.01)

(58) Field of Classification Search
CPC ........... H01M 10/6556; H01M 10/613; H01M 50/209; H01M 50/533; H01M 50/507
See application file for complete search history.

(56) References Cited

U.S. PATENT DOCUMENTS 10,297,885 B2 5/2019 Gayden et al.
10,319,978 B2 6/2019 Zeng et al.
(Continued)

FOREIGN PATENT DOCUMENTS

CN 108899600 A * 11/2018 ........ H01M 10/0525
CN 109525004 A * 3/2019 .......... H01M 10/441
(Continued)

OTHER PUBLICATIONS

CN109525004A, machine translation (Year: 2025).*
CN108899600A, machine translation (Year: 2025).*

*Primary Examiner* — Brian R Ohara
*Assistant Examiner* — M. T. Leonard

(57) ABSTRACT

A battery includes B groups of battery cells that are arranged adjacent to one another in a stacking direction, wherein B is an integer greater than one. The B groups of battery cells include B first battery cells each having a first shape, including first groups of external tabs and defining first recesses, respectively, and B second battery cells having the first shape, including second groups of external tabs, and defining second recesses, respectively. The B second battery cells are inverted and arranged adjacent to the B first battery cells in B planes that are arranged transverse to the stacking direction. The first recesses of the B first battery cells and the second recesses of the B second battery cells define a central tunnel running through the B groups of battery cells. The central tunnel is configured to receive a temperature adjustment device.

11 Claims, 13 Drawing Sheets

(51) Int. Cl.

| | |
|---|---|
| ***H01M 50/209*** | (2021.01) |
| ***H01M 50/507*** | (2021.01) |
| ***H01M 50/533*** | (2021.01) |

(56) References Cited

U.S. PATENT DOCUMENTS

| | | | | |
|---|---|---|---|---|
| 10,418,668 | B2 | 9/2019 | Wu et al. | |
| 10,461,318 | B2 | 10/2019 | Zeng et al. | |
| 10,601,046 | B2 | 3/2020 | Yu et al. | |
| 10,658,663 | B2 | 5/2020 | Zhang et al. | |
| 10,665,852 | B2 | 5/2020 | Yu et al. | |
| 10,826,139 | B2 | 11/2020 | Rich et al. | |
| 10,944,100 | B2 | 3/2021 | Liu et al. | |
| 11,427,914 | B2 | 8/2022 | Liu et al. | |
| 11,569,525 | B2 | 1/2023 | Liu et al. | |
| 2006/0127763 | A1* | 6/2006 | Watanabe | H01M 10/0413 429/254 |
| 2012/0021270 | A1 | 1/2012 | Kumar et al. | |
| 2013/0115505 | A1* | 5/2013 | Xie | H01M 10/6556 429/185 |
| 2015/0147622 | A1 | 5/2015 | Hwang et al. | |
| 2016/0226053 | A1* | 8/2016 | Wu | H01M 10/625 |
| 2017/0229733 | A1* | 8/2017 | Ohwada | H01M 10/052 |
| 2020/0220235 | A1 | 7/2020 | Wang | |

FOREIGN PATENT DOCUMENTS

| | | | |
|---|---|---|---|
| DE | 102020110774 | A1 | 10/2021 |
| KR | 100648704 | B1 | 11/2006 |
| KR | 20180013460 | A | 2/2018 |

* cited by examiner

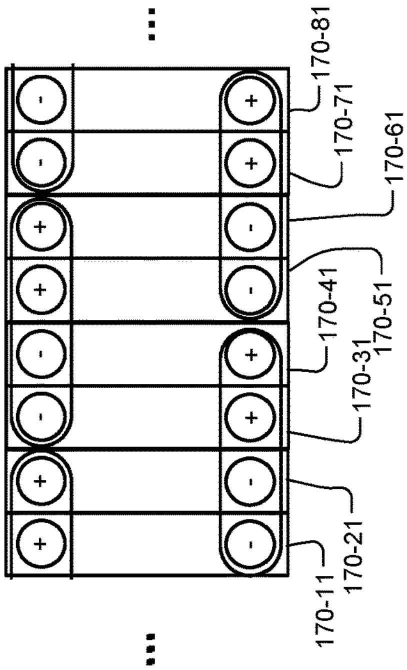
FIG. 15
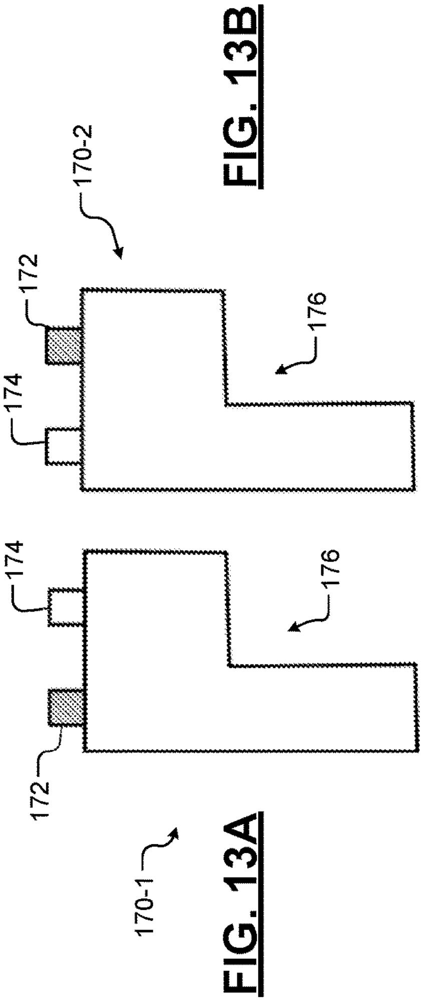
FIG. 13A
FIG. 13B
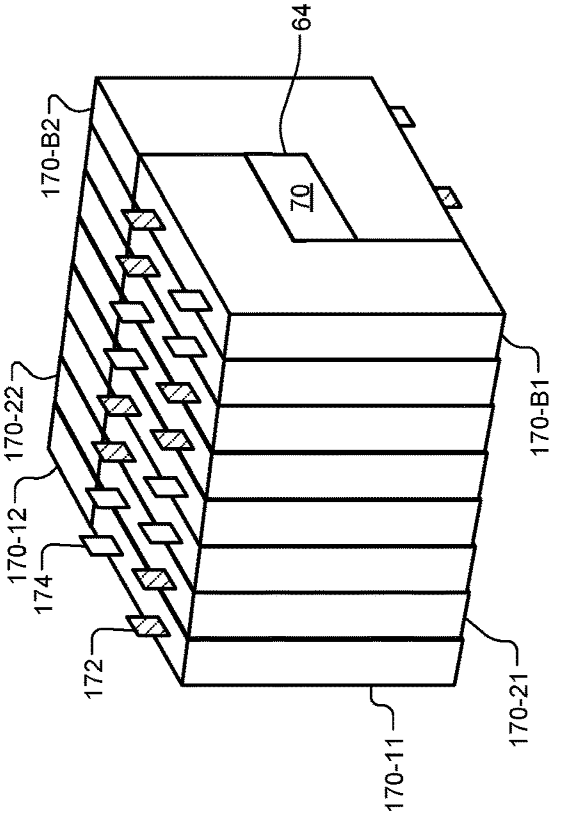
FIG. 14

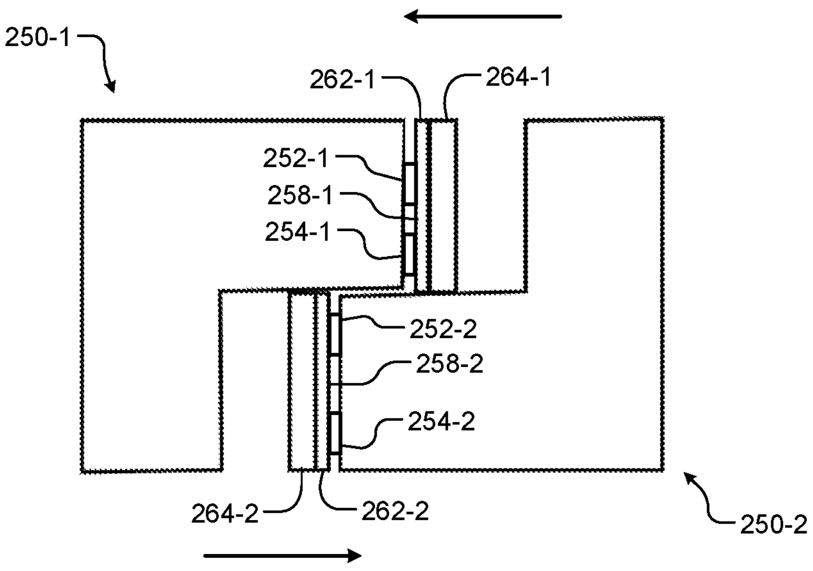
FIG. 25
FIG. 26
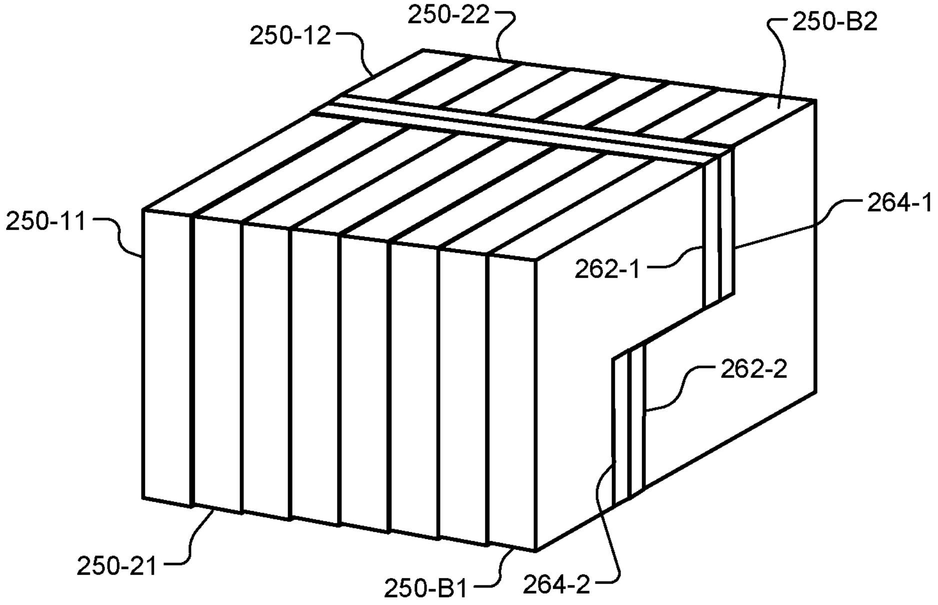

BATTERY WITH COMPLEMENTARY-SHAPED BATTERY CELLS AND CENTRAL COOLING TUNNEL

CROSS-REFERENCE TO RELATED APPLICATIONS

This application claims the benefit of Chinese Patent Application No. 202211013443.5, filed on Aug. 23, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to batteries, and more particularly to batteries including complementary-shaped battery cells and a central cooling tunnel.

Electric vehicles (EVs) such as battery electric vehicles (BEVs), hybrid vehicles, and/or fuel cell vehicles include one or more electric machines and a battery system including one or more battery cells, modules and/or packs. A power control system is used to control power to/from the battery system during charging, propulsion and/or regeneration.

Conventional lithium-ion batteries (LIB) systems include battery modules including battery cells that typically have a rectangular shape. The battery cells are arranged side by side in battery module and/or battery pack. Cooling/heating pans or manifolds are located below/above the battery cells of the battery module. This cooling/heating approach produces nonuniform temperature distribution along the bodies of the battery cells since the cooling or heating is performed from one side. The nonuniform temperature distribution causes variations in aging of different portions of the battery cell.

SUMMARY

A battery includes B groups of battery cells that are arranged adjacent to one another in a stacking direction, wherein B is an integer greater than one. The B groups of battery cells include B first battery cells each having a first shape, including first groups of external tabs and defining first recesses, respectively, and B second battery cells having the first shape, including second groups of external tabs, and defining second recesses, respectively. The B second battery cells are inverted and arranged adjacent to the B first battery cells in B planes that are arranged transverse to the stacking direction. The first recesses of the B first battery cells and the second recesses of the B second battery cells define a central tunnel running through the B groups of battery cells. The central tunnel is configured to receive a temperature adjustment device.

In other features, the first shape of the B first battery cells and the B second battery cells is "L"-shaped. The first shape of the B first battery cells and the B second battery cells is "L"-shaped. First and second surfaces in the first recesses and the second recesses are sloped relative to outer surfaces of the B first battery cells and the B second battery cells.

In other features, the B first battery cells and the B second battery cells are "C"-shaped. The B first battery cells further include first outer side surfaces. The B second battery cells include second outer side surfaces. All of the first groups of external tabs of the B first battery cells are located on the first outer side surfaces of the B first battery cells. All of the second groups of second external tabs of the B second battery cells are located on the second outer side surfaces of the B second battery cells.

In other features, at least one of the B first battery cells has a different polarity arrangement of the first groups of external tabs than another one of the B first battery cells. The B first battery cells further include first outer side surfaces and second outer side surfaces, respectively. The B second battery cells include third outer side surfaces and fourth outer side surfaces. The first groups of external tabs of the B first battery cells are located on the first and second outer side surfaces of the B first battery cells. The second groups of second external tabs of the B second battery cells are located on the third and fourth outer side surfaces of the B second battery cells.

In other features, a first polarity of the first groups of external tabs of the B first battery cells are located on the first outer side surfaces of the B first battery cell and a second polarity of the first groups of external tabs of the B first battery cells are located on the second outer side surfaces of the B first battery cells. A first polarity of the first groups of external tabs of the B second battery cells are located on the third outer side surfaces of the B second battery cell and a second polarity of the first groups of external tabs of the B second battery cells are located on the fourth outer side surfaces of the B second battery cells.

In other features, at least one of the B first battery cells has a different polarity arrangement of the first groups of external tabs than another one of the B first battery cells. At least one of the first groups of external tabs has a width that is greater than or equal to 100 mm.

A battery includes B groups of battery cells that are arranged adjacent to one another in a stacking direction, wherein B is an integer greater than one. The B groups of battery cells include B first battery cells each having an "L"-shaped cross section and including first groups of external tabs, respectively, and B second battery cells each having an "L"-shaped cross section and including second groups of external tabs, respectively. The B second battery cells are inverted and arranged adjacent to the B first battery cells in B planes that are arranged transverse to the stacking direction. Inner facing surfaces of the B first battery cells and the B second battery cells define first and second central tunnels running through the B groups of battery cells. The first groups of external tabs are arranged in the first central tunnel and the second groups of external tabs are arranged in the second central tunnel.

In other features, first busbars are arranged in the first central tunnel and connected to the first groups of external tabs. Second busbars are arranged in the second central tunnel and connected to the second groups of external tabs.

In other features, a first cooling device is arranged between the first busbars and an inner surface of the B second battery cells. A second cooling device is arranged between the second busbars and an inner surface of the B first battery cells. The B first battery cells and the B second battery cells have an "L"-shaped cross section.

A battery includes B groups of battery cells that are arranged adjacent to one another in a stacking direction, wherein B is an integer greater than one. The B groups of battery cells include B first battery cells each having a first shape and including first groups of external tabs, respectively, and B second battery cells having the first shape and including second groups of external tabs, respectively. B third battery cells each have a second shape and include third groups of external tabs, respectively. B fourth battery cells have the second shape and include fourth groups of external tabs, respectively. The B second battery cells are inverted and arranged adjacent to the B first battery cells in B planes that are transverse to the stacking direction. The B third battery cells are inverted and arranged adjacent to the B fourth battery cells in the B planes that are transverse to the stacking direction. Inner surfaces of the B first battery cells, the B second battery cells, the B third battery cells, and the B fourth battery cells define a first tunnel.

In other features, the B first battery cells and the B second battery cells have a first rectangular cross section and the B third battery cells and the B fourth battery cells have a second rectangular cross section that is different than the first rectangular cross section. A temperature adjustment device arranged in the first tunnel.

In other features, inner surfaces of the B first battery cells, the B second battery cells, the B third battery cells, and the B fourth battery cells define a first tunnel arranged between first inner surfaces of the B first battery cells and the B second battery cells, a second tunnel arranged between a first inner surface of the B third battery cells and second inner surfaces of the B first battery cells and the B second battery cells, and a third tunnel arranged between a first inner surface of the B fourth battery cells and third inner surfaces of the B first battery cells and the B second battery cells.

In other features, a first temperature adjustment device is arranged in the first tunnel, a second temperature adjustment device is arranged in the second tunnel. A third temperature adjustment device is arranged in the third tunnel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 13A and 13B are side views illustrating an example of a pair of complementary-shaped battery cells with external tabs having different polarity arrangements according to the present disclosure;

FIG. 14 is perspective view of an example of a battery module including a plurality of the battery cells of FIG. 13;

FIG. 15 is a side view illustrating an example of connections to external tabs for the battery module of FIG. 14;

FIG. 25 is a side view of complementary-shaped battery cells with external tabs and cooling located on inwardly facing surfaces thereof according to the present disclosure;

FIG. 26 is a perspective view of a battery system including complementary-shaped battery cells with external tabs and cooling located on inwardly facing surfaces thereof according to the present disclosure;

In the drawings, reference numbers may be reused to identify similar and/or identical elements.

DETAILED DESCRIPTION

While the batteries and/or battery cells are described below in the context of vehicles, the batteries and/or battery cells can be used in non-vehicle applications.

Battery cells described below include a plurality of complementary-shaped battery cell pairs or groups that define a central heating/cooling tunnel. While some of the examples set forth below include pairs of complementary-shaped, 2 or more complementary-shaped battery cells can be used. A temperature adjustment device such as a heating/cooling manifold is arranged in the central tunnel. In some examples, the complementary-shaped battery cells have an "L"-shaped configuration or other complementary configurations.

The temperature adjustment device that is arranged in the central tunnel of the complementary cell pairs improves heat exchange with the complementary-shaped battery cell pairs. The battery cells have more uniform temperature distribution as compared to batteries with one-sided temperature control. As a result, batteries using this design can handle increased power density with longer life.

Figure 2:
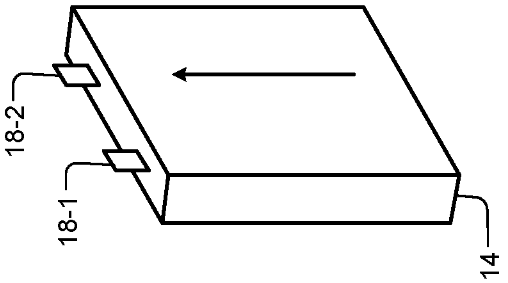
FIG. 2 is a perspective view of a battery cell of the battery system of FIG. 1.
Figure 3:
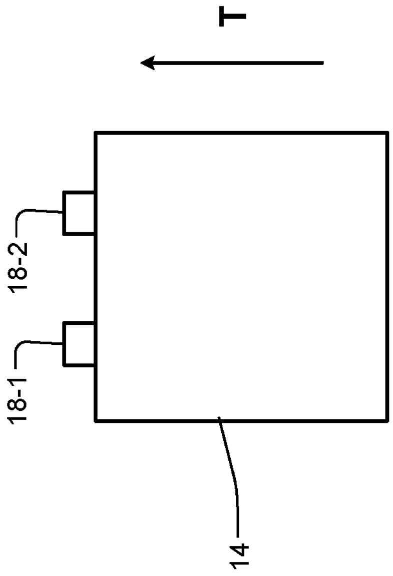
FIG. 3 is a side view of a battery cell of the battery system of FIG. 1.
Figure 1:
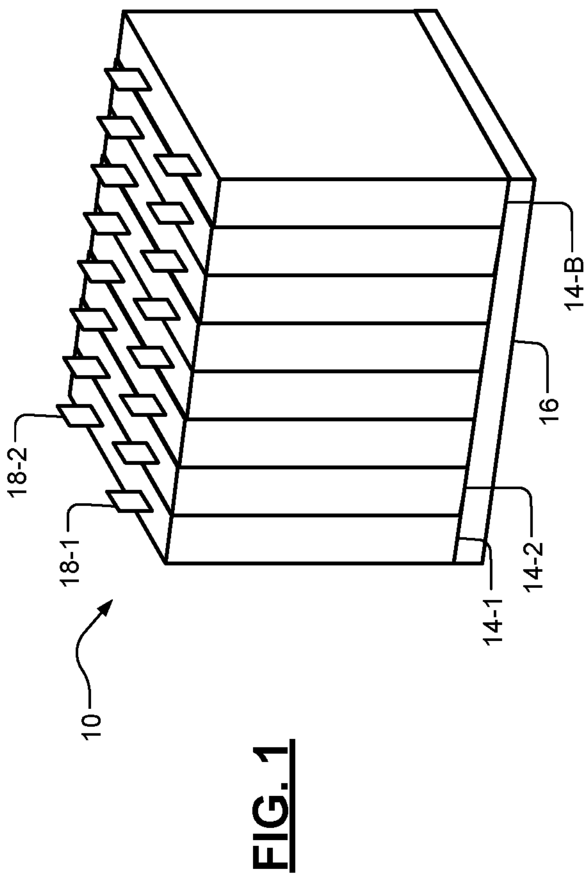
FIG. 1 is a perspective view of a battery system including a plurality of battery cells and a cooling manifold arranged on a bottom surface thereof.

Referring now to FIGS. 1 to 3, a battery 10 includes a plurality of battery cells 14-1, 14-2, . . . , 14-B (collectively or individually battery cells 14), where B is an integer. The plurality of battery cells 14-1, 14-2, . . . , 14-B have a generally rectangular shape or another shape and are stacked in a stacking direction. A temperature adjustment device 16 is arranged on one side (e.g., bottom side) thereof. In some examples, the temperature adjustment device 16 includes a pan or manifold configured to receive a heat exchange fluid (such as gas or liquid). In this example, the temperature adjustment device 16 is arranged on a bottom surface of the battery 10. If used, the pan or manifold receives temperature-controlled fluid (such as air, liquid or other fluid) that is cycled through the pan or manifold to remove heat from or add heat to the battery cells 14. In other examples, other types of temperature adjustment devices can be used. The battery cells 14 include external tabs 18-1 and 18-2 that provide external connections to anode and cathode current collectors of the battery cells 14.

In FIGS. 2 and 3, during operation of the battery 10, a temperature of the battery cells 14 tends to increase. In FIG. 2, the temperature adjustment device 16 is used to cool the battery cells 14. However, the cooling effect of the temperature adjustment device 16 decreases as a distance to the temperature adjustment device 16 increases. In other words, the bottom portions of the battery cells 14 are cooler than upper portions of the battery cells 14 that are located remote from the temperature adjustment device 16 as shown in FIG. 3. Over time, the temperature differential can cause upper and lower portions of the battery cells to age unevenly.

Figure 6:
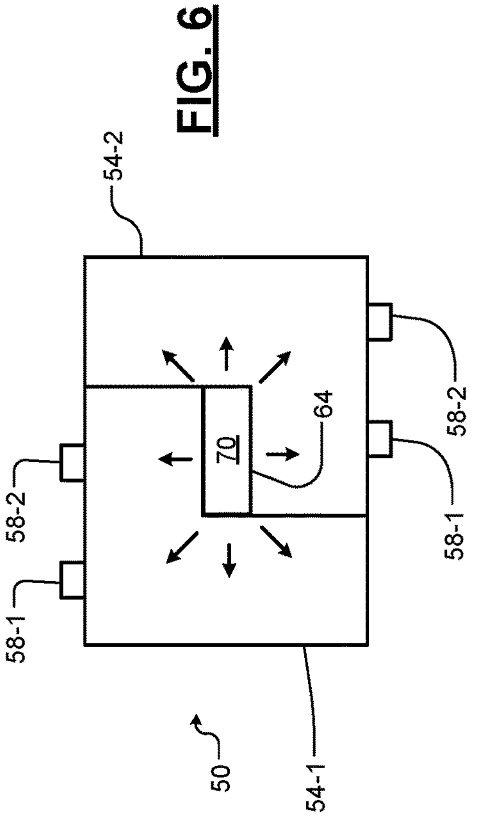
FIG. 6 is a side view of the pair of complementary-shaped battery cells of the battery system of FIG. 4.
Figure 5:
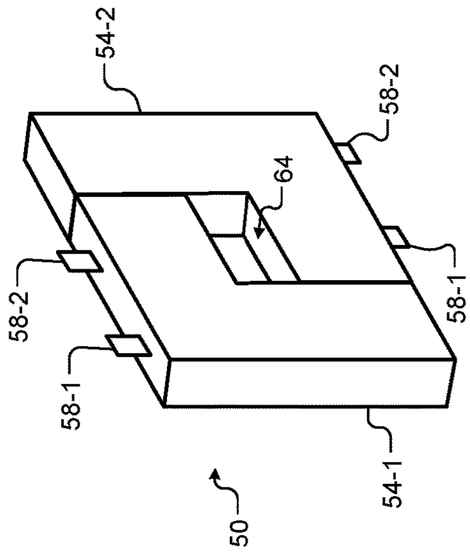
FIG. 5 is a perspective view of a pair of complementary-shaped battery cells of the battery system of FIG. 4.
Figure 4:
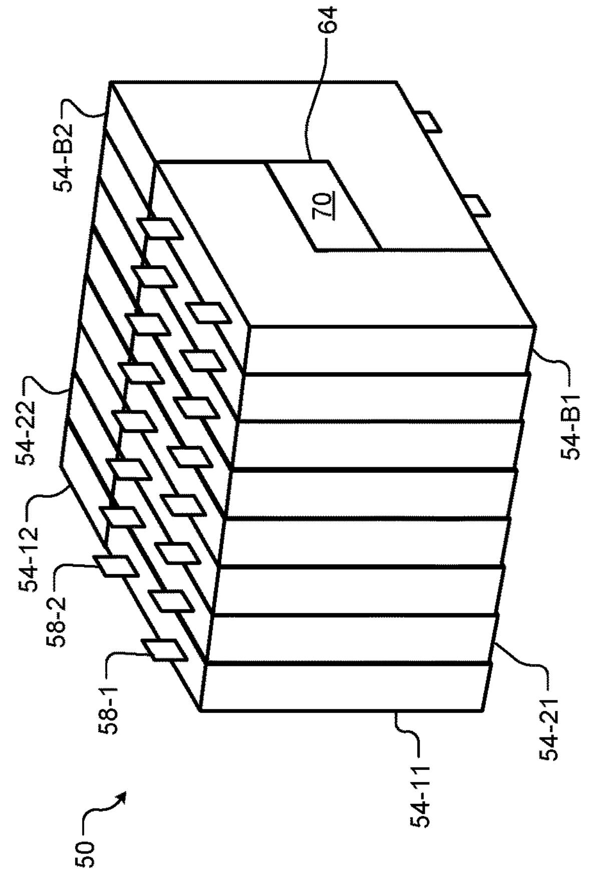
FIG. 4 is a perspective view of an example of a battery system including complementary-shaped battery cells and a central cooling manifold according to the present disclosure.

Referring now to FIGS. 4 to 6, a battery system according to the present disclosure includes pairs of complementary-shaped battery cells that are stacked and that define a central cooling tunnel to receive a temperature adjustment device.

In FIG. 4, a battery 50 includes pairs of complementary-shaped battery cells 54-11, 54-12, . . . , 54-B2 (collectively or individually battery cells 54). In some examples, the pairs of complementary-shaped battery cells (e.g., 54-11 and 54-12) have an "L"-shaped cross section. The pairs of complementary-shaped battery cells are stacked to define a central cooling tunnel 64 in the middle of the pairs of battery cells 54 that are complementary-shaped. In some examples, the central cooling tunnel 64 has a rectangular shape. In other examples, the central cooling tunnel 64 has a trapezoidal shape, a polygonal shape, a circular shape, an elliptical shape or another uniform or non-uniform shape.

The battery cells 54 are stacked in a stacking direction as best seen in FIG. 4. Each of the pairs of complementary-shaped battery cells (e.g., 54-11 and 54-12, 54-21 and 54-22, . . . ) are arranged on opposite sides of the central cooling tunnel and in adjacent planes that are arranged transverse to the stacking direction. The central cooling tunnel 64 extends in the stacking direction.

A temperature adjustment device 70 is arranged in the central cooling tunnel 64. In some examples, the temperature adjustment device 70 includes a manifold to receive temperature-controlled fluid to remove heat from and/or add heat to the battery cells 54. In other examples, other types of temperature adjustment devices can be used.

The battery cells 14 include external tabs 58-1 and 58-2 that provide connections to anode and cathode current collectors of the battery cells 54. In this example, the external tabs 58-1 and 58-2 are located on the same side of the battery cells 54, although other tab positions can be used.

In FIG. 6, during operation of the battery 50, a temperature of the battery cells 54 increases. The temperature adjustment device 70 is used to heat/cool the battery cells 54. Since the temperature adjustment device 70 is arranged more centrally relative to the pairs of complementary-shaped battery cells, the cooling effect extends radially outwardly (as shown by arrows) in all direction to more uniformly heat and/or cool the battery cells 54. The pairs of complementary-shaped battery cells include longer and shorter inner side surfaces. In this example, the longer side surfaces inside the "L" region abut one another.

Figure 7A:
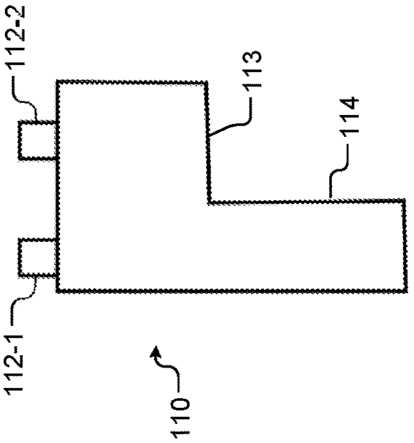
Figure 7B:
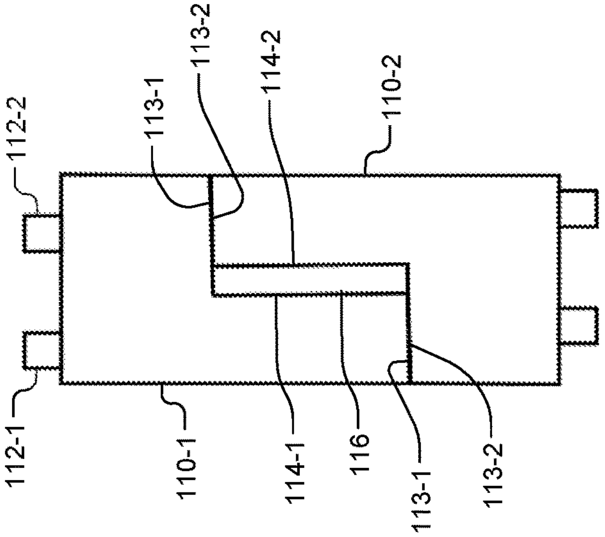

Referring now to FIGS. 7A to 12B, other complementary shapes and/or arrangements for the battery cells are shown. In FIGS. 7A and 7B, a battery cell 110 has an "L"-shaped cross-section and includes external tabs 112-1 and 112-2 and inner surfaces 113 and 114 defining a recess. In FIG. 7B, inner surfaces 113-1 and 113-2 of a pair of battery cells 110-1 and 110-2 abut one another. In some examples, the inner surfaces 114-1 and 114-2 define a central tunnel 116 that has a generally rectangular, trapezoidal, polygonal, circular, elliptical, uniform or non-uniform shape and is configured to receive the temperature adjustment device. The pairs of complementary-shaped battery cells include longer and shorter inner side surfaces. In this example, the shorter side surfaces inside the "L" region abut one another.

Figure 8A:
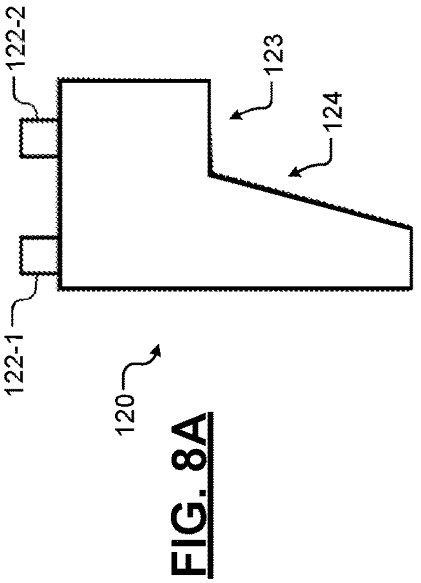
FIGS. 7A to 12B are side views of examples of other complementary shapes for the battery cells according to the present disclosure.
Figure 8B:
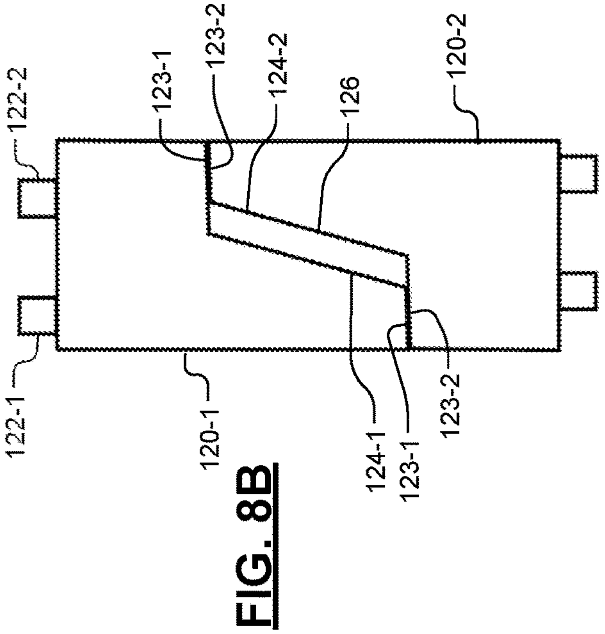

In FIGS. 8A and 8B, a battery cell 120 includes external tabs 122-1 and 122-2 and inner surfaces 123 and 124 defining a recess. In FIG. 8B, shorter inner surfaces 123-1 and 123-2 of a pair of battery cells 120-1 and 120-2 abut one another. Inner surfaces 124-1 and 124-2 are sloped at an angle relative to outer surfaces thereof. The inner surfaces 124-1 and 124-2 and the inner surfaces 123-1 and 123-2 define a central tunnel 126 that has a rhombus shape and is configured to receive the temperature adjustment device.

Figure 9A:
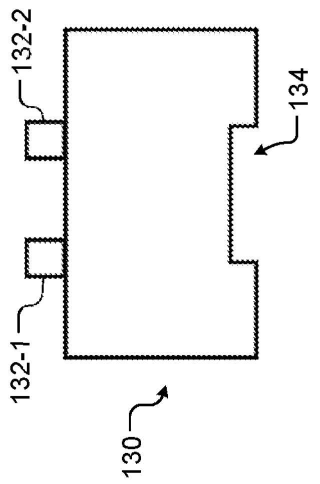
Figure 9B:
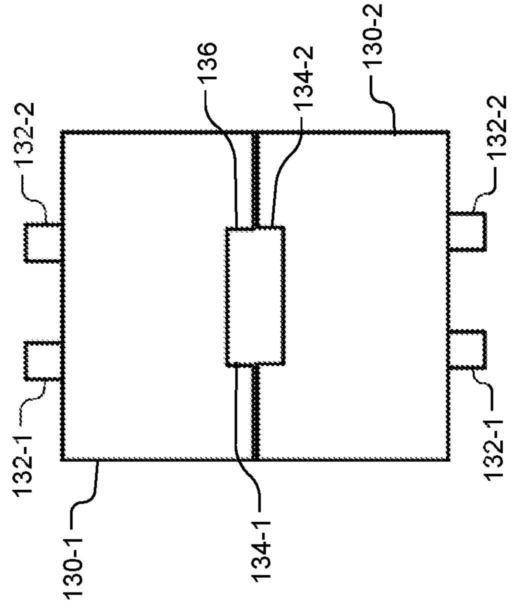
Figure 11A:
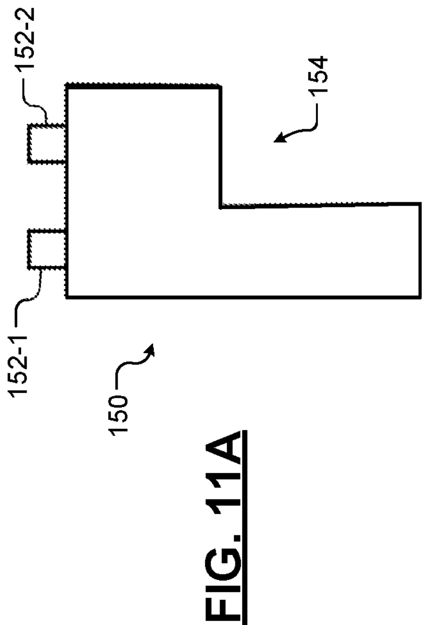
Figure 11B:
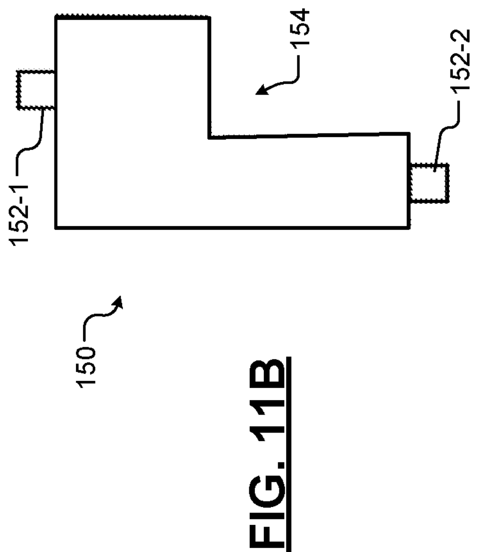

In FIGS. 9A and 9B, a battery cell 130 includes external tabs 132-1 and 132-2 and a recess 134 located on one side surface. In some examples, the battery cell 130 is "C"-shaped. In FIG. 9B, recesses 134-1 and 134-2 of a pair of battery cells 130-1 and 130-2 are aligned to define a central opening 136. The central opening 136 has a rectangular, trapezoidal, polygonal, elliptical, circular, uniform or non-uniform shape and is configured to receive the temperature adjustment device. In this example, the recesses 134-1 and 134-2 are located on a side opposite to a side including the external tabs 132-1 and 132-2.

Figure 10A:
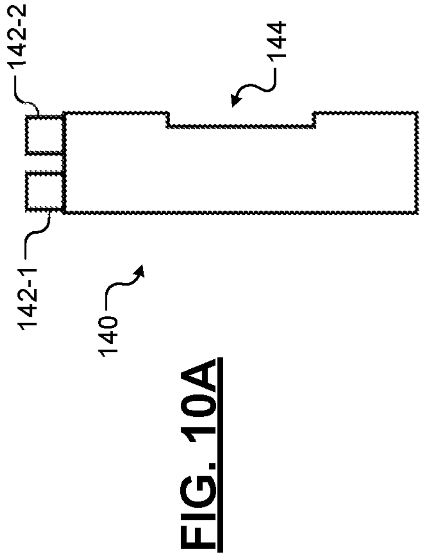
Figure 10B:
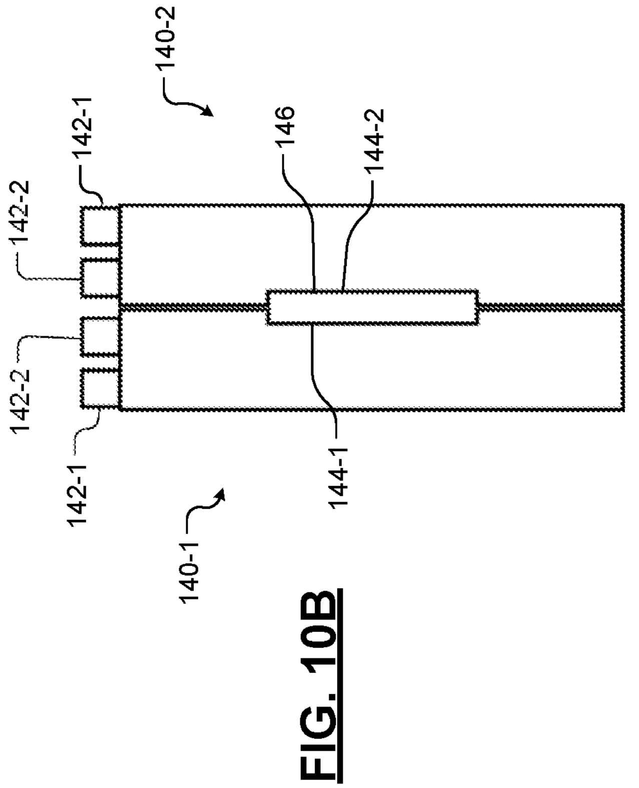

In FIGS. 10A and 10B, a battery cell 140 includes external tabs 142-1 and 142-2 and a recess 144 located on one side surface. In some examples, the battery cell 140 is "C"-shaped. In FIG. 10B, side surfaces with the recesses 144-1 and 144-2 of a pair of battery cells 140-1 and 140-2 are aligned to define a central opening 146. The central opening 146 has a rectangular shape and is configured to receive the temperature adjustment device. In this example, the recesses 144-1 and 144-2 are located on a side adjacent to a side including the external tabs 142-1 and 142-2.

While the external tabs are arranged on the same side, other arrangements can be used. For example in FIGS. 11A and 11B, a battery cell 150 has an "L"-shaped body and includes external tabs 152-1 and 152-2 and a recess 154. In FIG. 10A, the external tabs 152-1 and 152-2 are located on the same side surface of the battery cell 150. In FIG. 10B, the external tabs 152-1 and 152-2 are located on different side surfaces of the battery cell 150. In this example, the external tabs 152-1 and 152-2 are located on opposite surfaces (e.g., top and bottom surfaces corresponding to shorter side surfaces).

Figure 12A:
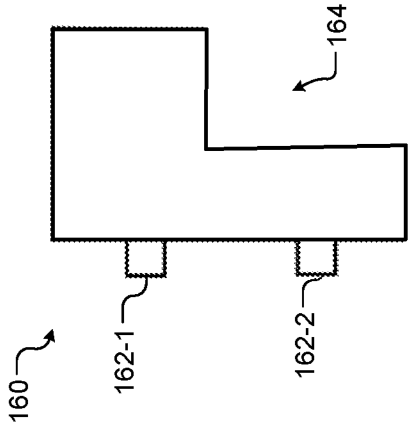
Figure 12B:
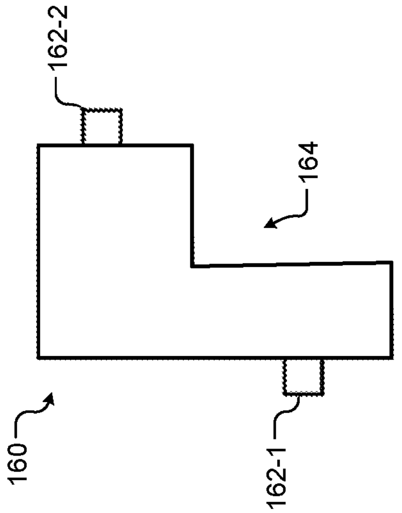

In FIGS. 12A and 12B, a battery cell 160 has an "L"-shaped body and includes external tabs 162-1 and 162-2 and a recess 164. In FIG. 12A, the external tabs 162-1 and 162-2 are located on the same side surface of the battery cell 160 corresponding to a longest side. In FIG. 12B, the external tabs 162-1 and 162-2 are located on different side surfaces of the battery cell 160. In this example, the external tabs 162-1 and 162-2 are located on opposite side surfaces (corresponding to a longer side surface and an opposite surface).

Referring now to FIGS. 13A to 15, a pair of complementary-shaped battery cells with external tabs having different polarity arrangements is shown. In FIG. 13A, a battery cell 170-1 has an "L"-shaped body and includes external tabs 172 and 174 and a recess 176. In FIG. 13B, a battery cell 170-2 has an "L"-shaped body and includes external tabs 172 and 174 and a recess 176. The external tab 172 can be connected to anode or cathode electrodes and the external tab 174 can be connected to cathode or anode electrodes, respectively. As can be seen, the external tabs 172 and 174 of the battery cells 170-1 and 170-2 are arranged with opposite polarity. In other words, the external tab 174 in FIG. 13A is arranged on a side immediately adjacent to the recess 176. In FIG. 13B, the external tab 172 is arranged on a side immediately adjacent to the recess 176.

In FIGS. 14 and 15, the battery cells 170-1 and 170-2 are arranged as a battery module. Two adjacent pairs of the battery cells (e.g., 170-11 and 170-12 and 170-21 and 170-22) are arranged with the external tabs having the same polarity and then the next two adjacent pairs of the battery cells have the opposite polarity. Then, the pattern repeats.

In FIG. 15, the external tabs of the battery cells can be connected as shown. More particularly, the negative terminals of battery cells 170-11 and 170-21 are connected to the positive terminals of battery cells 170-31 and 170-41. The negative terminals of battery cells 170-51 and 170-61 are connected to the positive terminals of battery cells 170-71 and 170-81. The negative terminals of battery cells 170-31 and 170-41 are connected to the positive terminals of battery cells 170-51 and 170-61. The terminals of the other battery cells are connected in a similar way.

Figure 16B:
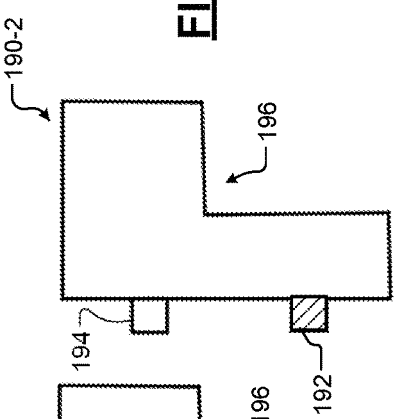
FIGS. 16A and 16B are side views illustrating examples of complementary-shaped battery cells with terminals having different polarity arrangements according to the present disclosure.
Figure 16A:
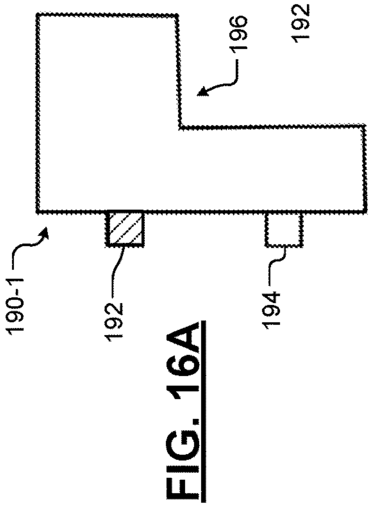

Referring now to FIGS. 16A to 18, a pair of complementary-shaped battery cells with external tabs having different polarity arrangements is shown. In FIG. 16A, a battery cell 190-1 has an "L"-shaped body and includes external tabs 192 and 194 and a recess 196. The external tabs 192 and 194 are located on the same side that is arranged opposite to the recess 196.

In FIG. 16B, a battery cell 190-2 has an "L"-shaped body and includes external tabs 192 and 194 and a recess 196. The external tab 192 can be connected to anode or cathode electrodes and the external tab 194 can be connected to cathode or anode electrodes, respectively. As can be seen, the external tabs 192 and 194 of the battery cells 190-1 and 190-2 have opposite polarities.

Figure 18:
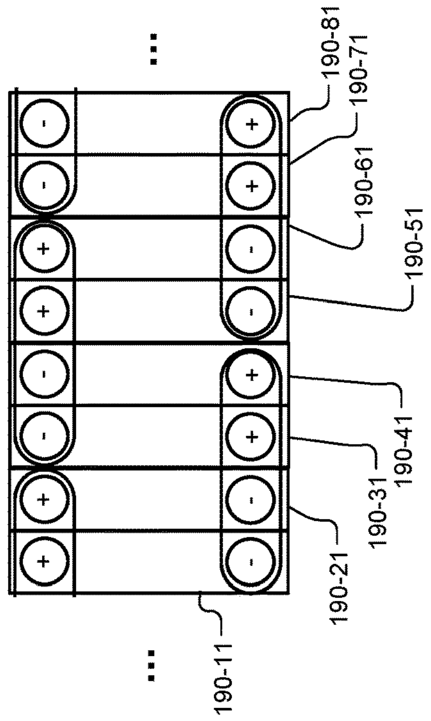
FIG. 18 is a side view illustrating an example of connections to external tabs for the battery module of FIG. 16.
Figure 17:
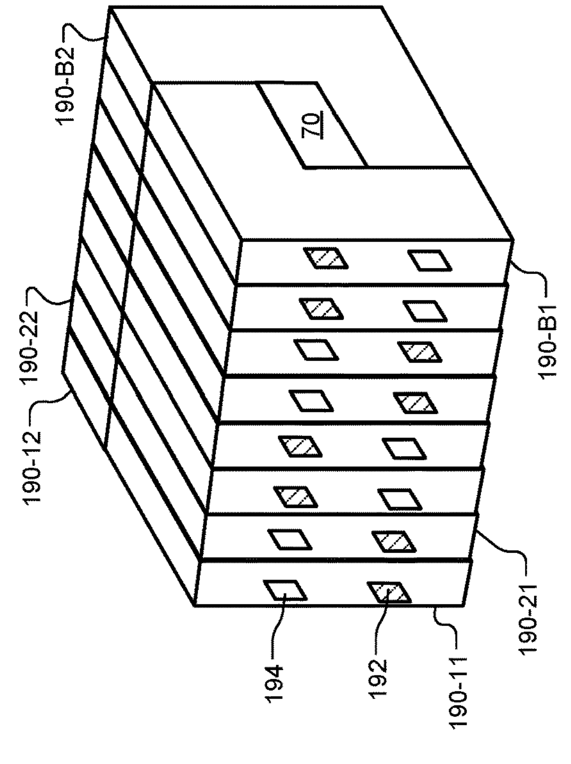
FIG. 17 is perspective view of an example of a battery module including a plurality of the battery cells of FIG. 16.

In FIGS. 17 and 18, the battery cells 190-1 and 190-2 are arranged as a battery module. Two adjacent pairs of the battery cells (e.g., 190-11 and 190-12 and 190-21 and 190-22) are arranged with the external tabs having the same polarity and then the next two adjacent pairs of the battery cells have the opposite polarity. Then, the pattern repeats.

In FIG. 18, the external tabs of the battery cells are connected as shown (e.g., a 2P4S arrangement). In this example, two cells are connected in parallel and the parallel connected group is connected serially to form a 2SnP design, where n is integer. Other connection arrangements, such as mSnP, are connected in a similar manner by placing m cells with same polarity welded together, where m in an integer greater than or equal to 1. More particularly, the negative terminals of battery cells 190-11 and 190-21 are connected to the positive terminals of battery cells 190-31 and 190-41. The negative terminals of battery cells 190-51 and 190-61 are connected to the positive terminals of battery cells 190-71 and 190-81. The negative terminals of battery cells 190-31 and 190-41 are connected to the positive terminals of battery cells 190-51 and 190-61. The terminals of the other battery cells are connected in a similar way.

Figure 19B:
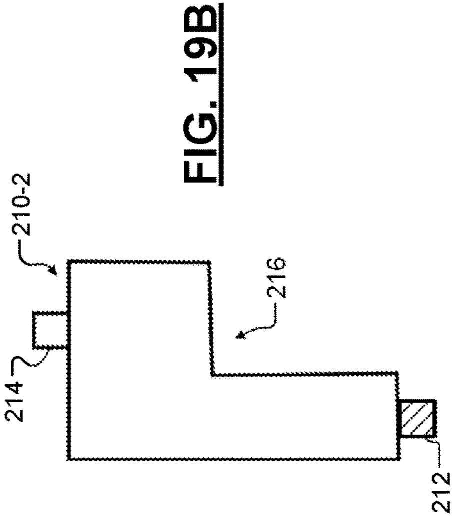
FIGS. 19A and 19B are side views illustrating examples of complementary-shaped battery cells with terminals having different polarity arrangements according to the present disclosure.
Figure 19A:
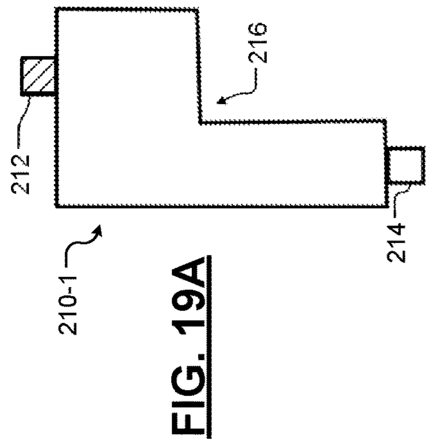

Referring now to FIGS. 19A to 21, a pair of complementary-shaped battery cells with external tabs having different polarity arrangements is shown. In FIG. 19A, a battery cell 210-1 has an "L"-shaped body and includes external tabs 212 and 214 and a recess 216. The external tabs 212 and 214 are located on opposite sides that are adjacent to the recess 216.

In FIG. 19B, a battery cell 210-2 has an "L"-shaped body and includes external tabs 212 and 214 and a recess 216. The external tab 212 can be connected to anode or cathode electrodes and the external tab 214 can be connected to cathode or anode electrodes, respectively. As can be seen, the external tabs 212 and 214 of the battery cells 210-1 and 210-2 are arranged with opposite polarity on opposite side surfaces.

Figure 21:
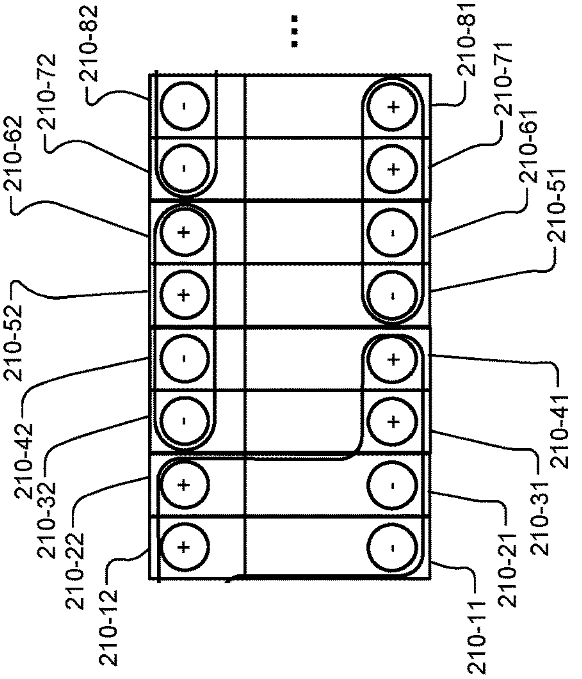
FIG. 21 is a side view illustrating an example of connections to external tabs for the battery module of FIG. 19.
Figure 20:
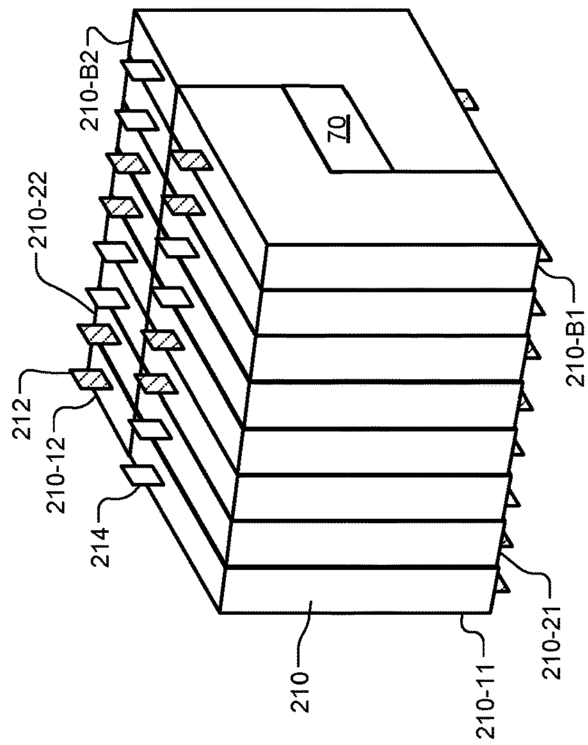
FIG. 20 is perspective view of an example of a battery module including a plurality of the battery cells of FIG. 19.

In FIGS. 20 and 21, the battery cells 210-1 and 210-2 are arranged as a battery module. Two adjacent pairs of the battery cells (e.g., 210-11 and 210-12 and 210-21 and 210-22) are arranged with the external tabs having the same polarity and then the next two adjacent pairs of the battery cells have the opposite polarity. Then, the pattern repeats.

In FIG. 21, the external tabs of the battery cells can be connected as shown. More particularly, the positive terminals of the battery cells 210-12, 210-22, 210-31 and 210-41 and the negative terminals of the battery cells 210-11 and 210-21 are connected together. The negative terminals of the battery cells 210-32 and 210-42 are connected to the positive terminals of the battery cells 210-52 and 210-62. The negative terminals of the battery cells 210-51 and 210-61 are connected to the positive terminals of the battery cells 210-71 and 210-81. Other battery cells are connected in a similar way. In this example, two cells are connected in parallel and the parallel connected group is then connected serially to form a 2SnP design, where n is integer. Other connecting arrangements, such as mSnP, are connected in the same way by welding m cells with same polarity together, where m is an integer greater than zero.

Figure 22A:
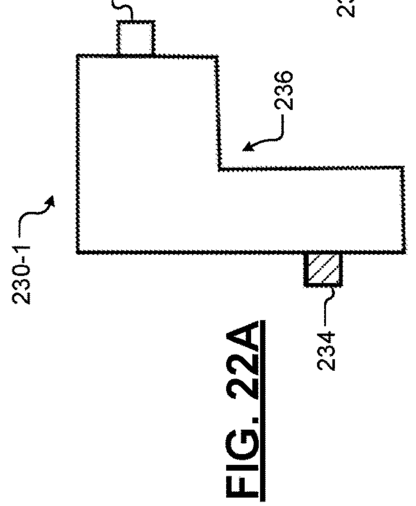
FIGS. 22A and 22B are side views illustrating examples of complementary-shaped battery cells with terminals having different polarity arrangements according to the present disclosure.

Referring now to FIGS. 22A to 24, a pair of complementary-shaped battery cells with external tabs having different polarity arrangements is shown. In FIG. 22A, a battery cell 230-1 has an "L-shaped body and includes external tabs 232 and 234 and a recess 236. The external tabs 232 and 234 are arranged on opposite sides of the battery cells (adjacent to the recess 236).

Figure 22B:
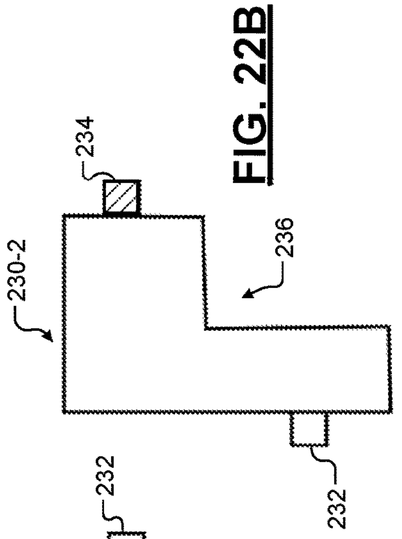

In FIG. 22B, a battery cell 230-2 has an "L"-shaped body and includes external tabs 232 and 234 and a recess 236. The external tab 232 can be connected to anode or cathode electrodes and the external tab 234 can be connected to cathode or anode electrodes, respectively. As can be seen, the external tabs 232 and 234 of the battery cells 230-1 and 230-2 are arranged with opposite polarity.

Figure 23:
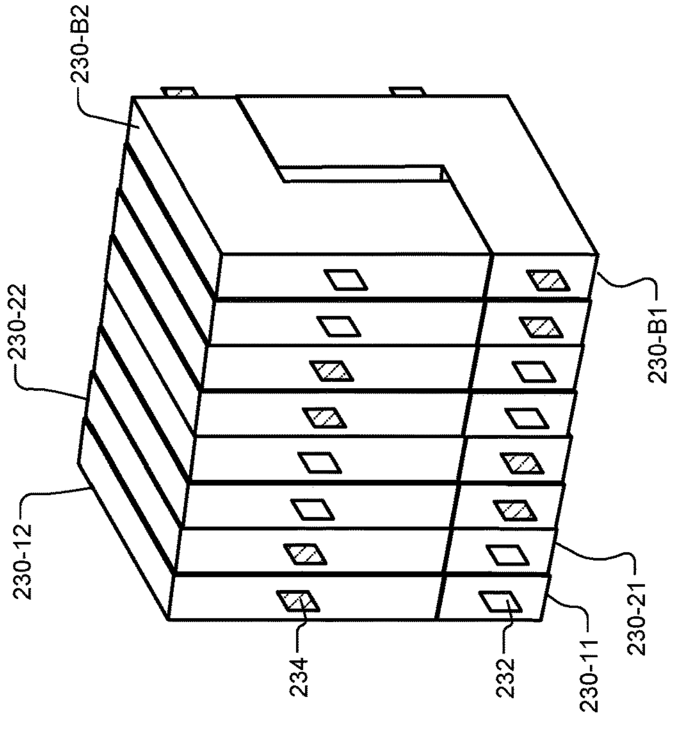
FIG. 23 is perspective view of an example of a battery module including a plurality of the battery cells of FIG. 22.
Figure 24:
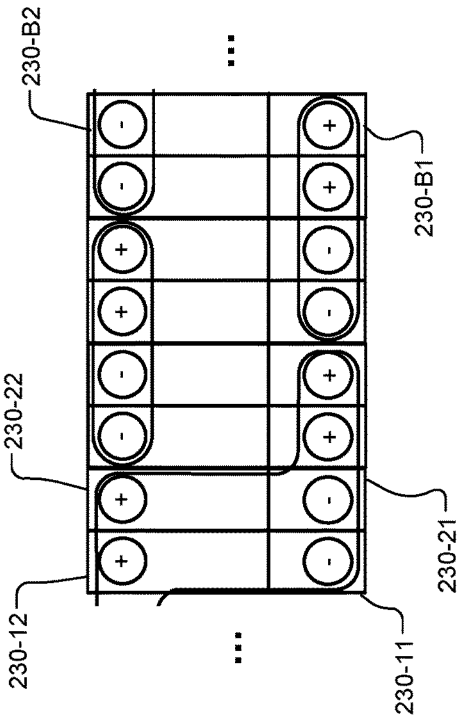
FIG. 24 is a side view illustrating an example of connections to external tabs for the battery module of FIG. 22.

In FIGS. 23 and 24, the battery cells 230-1 and 230-2 are arranged as a battery module. Two adjacent pairs of the battery cells (e.g., 230-11 and 230-12 and 230-21 and 230-22) are arranged with the external tabs having the same polarity and then the next two adjacent pairs of the battery cells have the opposite polarity. Then, the pattern repeats. In FIG. 24, the external tabs of the battery cells can be connected in a manner similar to FIG. 21. In this example, two cells are connected in parallel and the parallel connected group is then connected serially to form a 2SnP design, where n is integer. Other connecting arrangements, such as mSnP, are connected in the same way by welding m cells with same polarity together, where m is an integer greater than zero.

Referring now to FIGS. 25 and 26, complementary-shaped battery cells with external tabs and cooling located on inwardly facing surfaces thereof are shown. In FIG. 25, a pair of complimentary battery cells 250-1 and 250-2 are shown. The battery cell 250-1 includes external tabs 252-1 and 254-1 connected to a busbar 258-1. A temperature adjustment device 264-1 is arranged between the busbar 258-1 and an inner facing surface of the battery cell 250-1. A battery cell 250-2 includes external tabs 252-2 and 254-2 connected to a busbar 258-2. A temperature adjustment device 264-2 is arranged between the busbar 258-2 and an inner facing surface of the battery cell 250-2. In FIG. 26, a battery includes a plurality of pairs of complementary battery cells 250-11, 250-12, 250-21, 250-22, . . . , 250-B1 and 250-B2 (collectively or individually battery cells 250). The temperature adjustment devices 264-1 and 264-2 heat/cool the battery cells 250 more uniformly. Cell arrangement can be FIG. 25 or FIG. 26, based on module/pack requirement.

Figure 27:
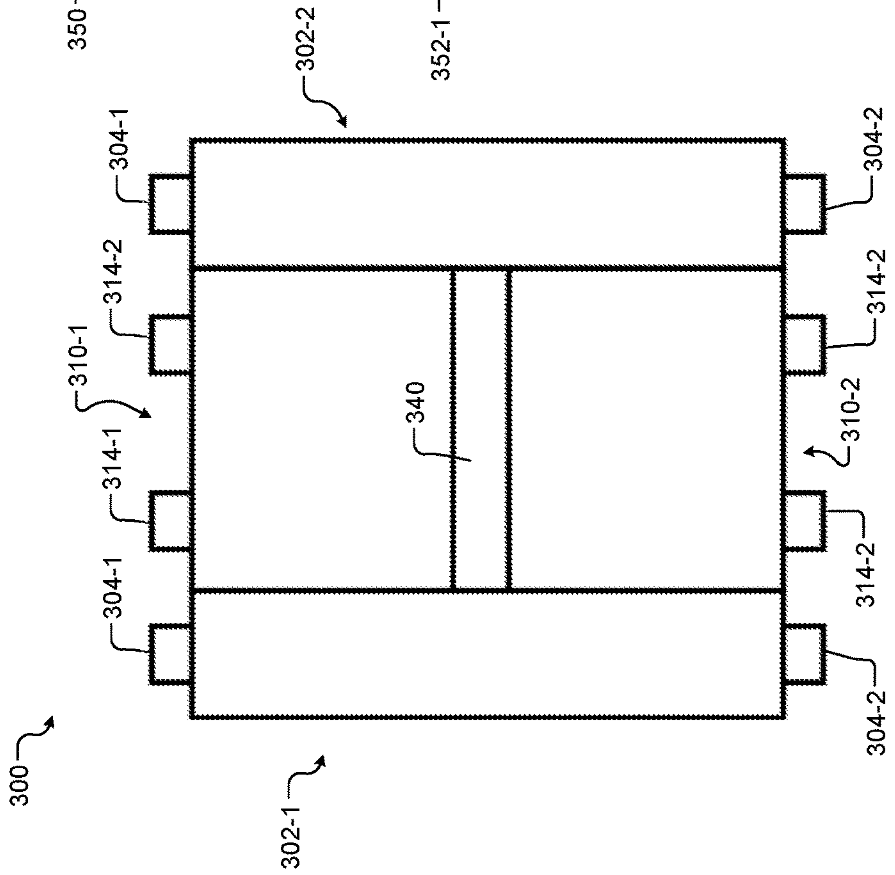
FIG. 27 is a side view of a battery system including four battery cells having two different shapes and a central cooling manifold according to the present disclosure.

Referring now to FIG. 27, a battery includes battery units 300 that are stacked in a stacking direction. Each of the battery units 300 includes four battery cells having two different shapes and a central cooling manifold. The battery unit 300 includes first and second battery cells 302-1 and 302-2 that include external tabs 304-1 and 304-2, are rectangular and have the same cross-sectional size. The battery unit 300 includes third and fourth battery cells 310-1 and 310-2 that are rectangular and have the same cross-sectional size (that is the same as or different than the first and second battery cells 302-1 and 302-2). A temperature adjustment device 340 is arranged between and in contact with surfaces of the first and second battery cells 302-1 and 302-2 and between the third and fourth battery cells 310-1 and 310-2. A battery includes a plurality of the battery unit 300 that are arranged side by side.

Figure 28:
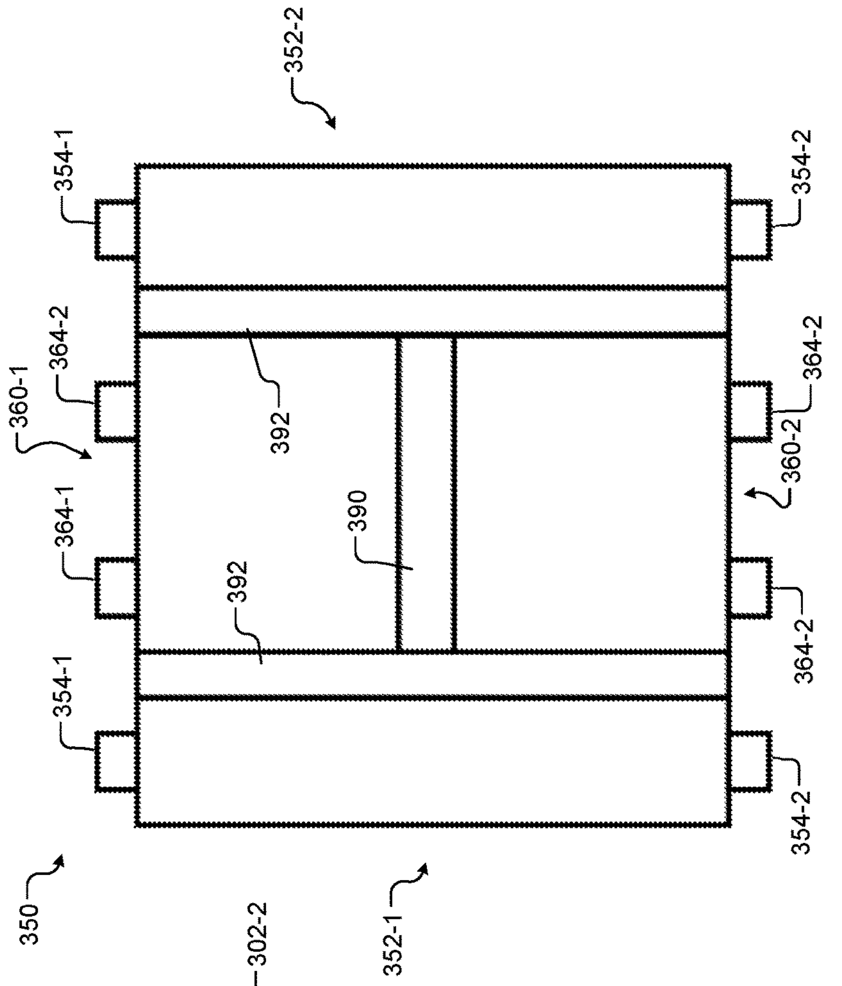
FIG. 28 is a side view of a battery system including four battery cells having two different shapes and a central cooling manifold according to the present disclosure.

Referring now to FIG. 28, a battery includes battery units 350 that are stacked in a stacking direction. Each of the battery units 350 includes four battery cells having two different shapes and a central cooling manifold. The battery unit 350 includes first and second battery cells 352-1 and 352-2 that include external tabs 354-1 and 354-2, are rectangular and have the same cross-sectional size. The battery unit 350 includes third and fourth battery cells 360-1 and 360-2 that are rectangular and have the same cross-sectional size (that is the same as or different than the first and second battery cells 352-1 and 352-2). One or more temperature adjustment devices 390 and 392 are arranged between and in contact with surfaces of the first and second battery cells 352-1 and 352-2 and the third and fourth battery cells 360-1 and 360-2. In the example shown, the first temperature adjustment device 390 is located between surfaces of the first and second battery cells 352-1 and 352-2. The second and third temperature adjustment devices 392 are located between side surfaces of the first and second battery cells 352-1 and 352-2, respectively, and corresponding side surfaces of the third and fourth battery cells 360-1 and 360-2. The battery includes a plurality of the battery units 350 that are arranged side by side in the stacking direction.

Figure 29A:
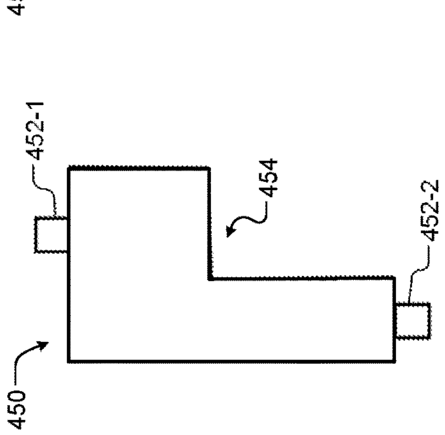
FIGS. 29A to 32B are side views illustrating battery cells with complementary shapes and one or more wider terminals according to the present disclosure.
Figure 29B:
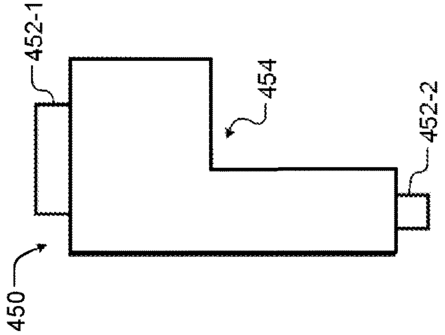

Referring now to FIGS. 29A to 32B, battery cells with complementary shapes and one or more wider terminals are shown. In FIGS. 29A and 29B, a battery cell 450 has an "L"-shaped body and includes external tabs 452-1 and 452-2 and a recess 454. The external tabs 452-1 and 452-2 are located on top and bottom sides of the body. In FIG. 29A, the external tabs 452-1 and 452-2 have the same width. In some examples, the width is less than or equal to 50 mm. In FIG. 29B, the external tab 452-1 is wider than the external tab 452-2. In some examples, the width of the external tab 452-1 is greater than or equal to 100 mm and the width of the tab is less than or equal to 50 mm.

Figure 30A:
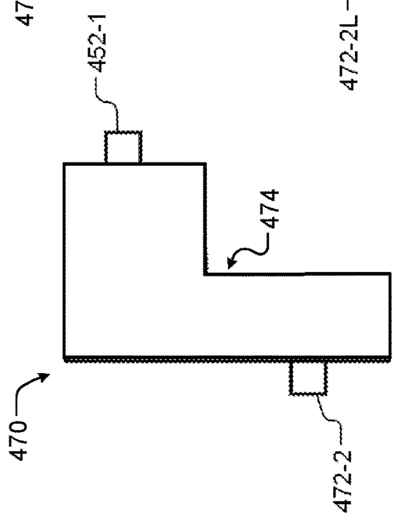
Figure 30B:
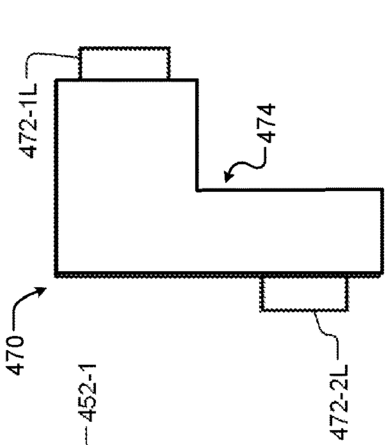

In FIGS. 30A and 30B, a battery cell 470 has an "L"-shaped body and includes external tabs 472-1 and 472-2 and a recess 474. The external tabs 472-1 and 472-2 are located on left and right sides of the body. In FIG. 30A, the external tabs 472-1 and 472-2 have the same width. In some examples, the width is less than or equal to 50 mm. In FIG. 30B, the external tabs 472-1 and 472-2 are wider than the external tabs in FIG. 30A. In some examples, the width of the external tabs 472-1 and 472-2 are greater than or equal to 100 mm.

Figure 31A:
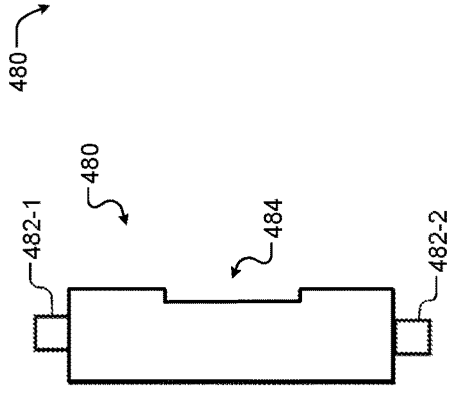
Figure 31B:
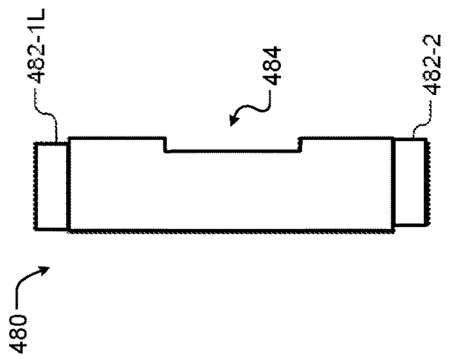

In FIGS. 31A and 31B, a battery cell 480 has an "C"-shaped body and includes external tabs 482-1 and 482-2 and a recess 484. The external tabs 482-1 and 482-2 are located on top and bottom sides of the body (adjacent to the side with the recess 484). In FIG. 31A, the external tabs 482-1 and 482-2 have the same width. In some examples, the width is less than or equal to 50 mm. In FIG. 31B, the external tabs 482-1 and 482-2 are wider than the external tabs in FIG. 31A. In some examples, the width of the external tabs 482-1 and 482-2 are greater than or equal to 100 mm.

Figure 32A:
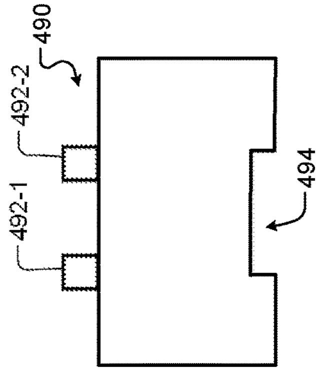
Figure 32B:
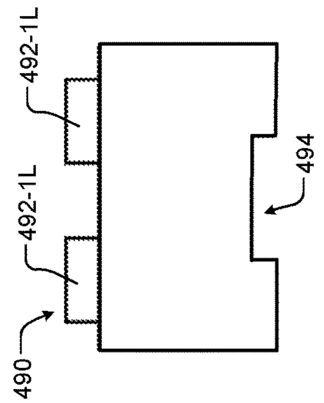

In FIGS. 32A and 32B, a battery cell 490 has an "C"-shaped body and includes external tabs 492-1 and 492-2 and a recess 494. The external tabs 492-1 and 492-2 are located on the same side of the body (opposite to the side with the recess).

In FIG. 32A, the external tabs 492-1 and 492-2 have the same width. In some examples, the width is less than or equal to 50 mm. In FIG. 32B, the external tabs 492-1 and 492-2 are wider than the external tabs in FIG. 32A. In some examples, the width of the external tabs 492-1 and 492-2 are greater than or equal to 100 mm.

Figure 33A:
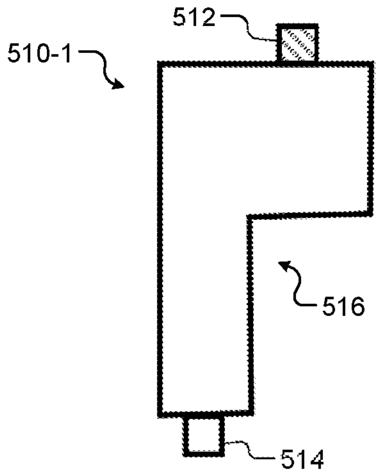
FIGS. 33A and 33B are side views of examples battery cells with complementary shapes and external tabs with different polarity arrangements according to the present disclosure.
Figure 33B:
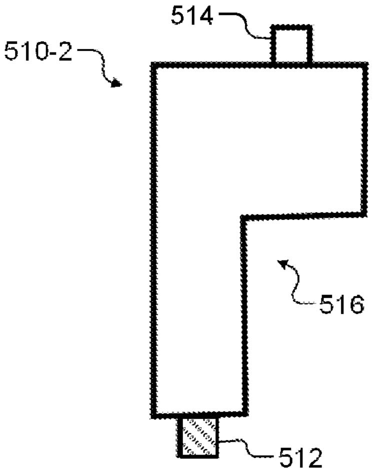
Figure 34:
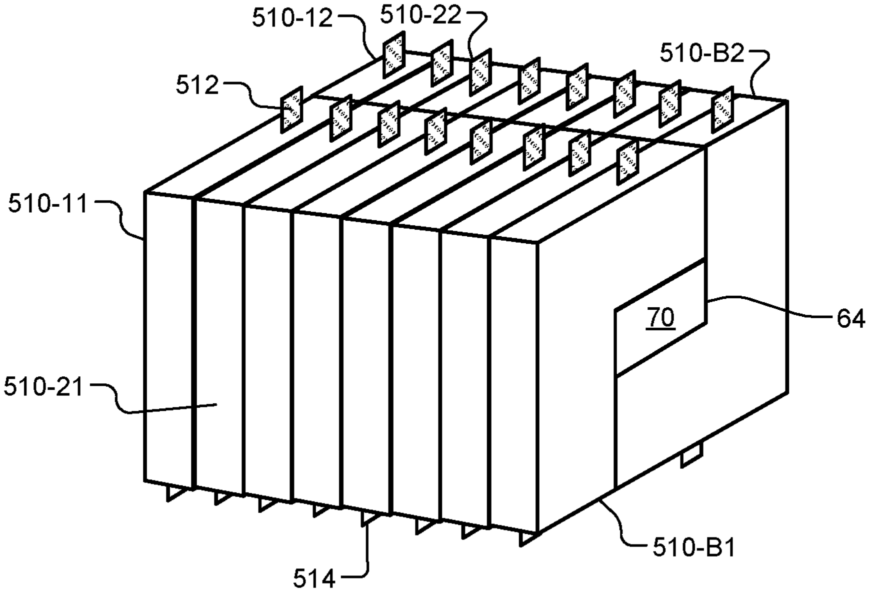
FIG. 34 is a perspective view of an example of a battery system including battery cells with complementary shapes, a central cooling manifold and external tabs according to the present disclosure.

Referring now to FIGS. 33A to 34, a pair of complementary-shaped battery cells with external tabs is shown. In FIG. 33A, a battery cell 510-1 has an "L"-shaped body and includes external tabs 512 and 514 and a recess 516. In FIG. 33B, a battery cell 510-2 has an "L"-shaped body and includes external tabs 512 and 514 and a recess 516. The external tab 512 can be connected to anode or cathode electrodes and the external tab 514 can be connected to cathode or anode electrodes, respectively. In FIG. 34, pairs of the battery cells 510-11, 510-12, 510-21, 510-22, 510-B1 and 510-B2 are arranged as a battery module with the external tabs 512 located on one side and the external tabs 514 located on the opposite side. In other words, connections to the cathodes (or anodes) are arranged on one side of the battery and connections to anodes (or cathodes) are arranged on the opposite side of the battery.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A battery comprising:

B groups of complementary-shaped battery cells that are arranged adjacent to one another in a stacking direction, wherein B is an integer greater than one, and that include:

B first battery cells each having a first shape, including first groups of external tabs and a first outermost exterior surface perimeter including first external surfaces defining first recesses, respectively; and B second battery cells having the first shape, including second groups of external tabs and a second outermost exterior surface perimeter including second external surfaces defining second recesses, respectively, wherein the B second battery cells are inverted and arranged adjacent to the B first battery cells in B planes that are arranged transverse to the stacking direction such that the first external surfaces complementarily face toward the second external surfaces, wherein the first recesses of the B first battery cells and the second recesses of the B second battery cells define a central tunnel running through the B groups of complementary-shaped battery cells external to the first outermost exterior surface perimeter and the second outermost exterior surface perimeter, wherein a first half of an outer perimeter of the central tunnel is defined by the first external surfaces and a second half of the outer perimeter of the central tunnel is defined by the second external surfaces, and wherein the central tunnel is configured to receive a temperature adjustment device.

2. The battery of claim 1, wherein the first shape of the B first battery cells and the B second battery cells is "L"-shaped such that the first outermost exterior surface perimeter defines an "L"-shaped body of the B first battery cells and the second outermost exterior surface perimeter defines an "L"-shaped body of the B second battery cells, wherein the central tunnel is external to the "L"-shaped body of the B first battery cells and external to the "L"-shaped body of the B second battery cells.

3. The battery of claim 1, wherein:

the first shape of the B first battery cells and the B second battery cells is "L"-shaped, and first and second external surfaces in the first recesses and the second recesses are sloped relative to outer surfaces of the B first battery cells and the B second battery cells.

4. The battery of claim 1, wherein the B first battery cells and the B second battery cells are "C"-shaped such that the first outermost exterior surface perimeter defines a "C"-shaped body of the B first battery cells and the second outermost exterior surface perimeter defines a "C"-shaped body of the B second battery cells, wherein the central tunnel is external to the "C"-shaped body of the B first battery cells and external to the "C"-shaped body of the B second battery cells.

5. The battery of claim 1, wherein:

the B first battery cells further include first outer side surfaces along the first outermost exterior surface perimeter, the B second battery cells include second outer side surfaces along the second outermost exterior surface perimeter, all of the first groups of external tabs of the B first battery cells are located on the first outer side surfaces of the B first battery cells, and all of the second groups of second external tabs of the B second battery cells are located on the second outer side surfaces of the B second battery cells.

6. The battery of claim 5, wherein at least one of the B first battery cells has a different polarity arrangement of the first groups of external tabs than another one of the B first battery cells.

7. The battery of claim 1, wherein:

the B first battery cells further include first outer side surfaces and second outer side surfaces along the first outermost exterior surface perimeter, respectively, the B second battery cells include third outer side surfaces and fourth outer side surfaces along the second outermost exterior surface perimeter, respectively, the first groups of external tabs of the B first battery cells are located on the first and second outer side surfaces of the B first battery cells, and the second groups of second external tabs of the B second battery cells are located on the third and fourth outer side surfaces of the B second battery cells.

8. The battery of claim 7, wherein:

a first polarity of the first groups of external tabs of the B first battery cells are located on the first outer side surfaces of the B first battery cell and a second polarity of the first groups of external tabs of the B first battery cells are located on the second outer side surfaces of the B first battery cells, and a first polarity of the first groups of external tabs of the B second battery cells are located on the third outer side surfaces of the B second battery cell and a second polarity of the first groups of external tabs of the B second battery cells are located on the fourth outer side surfaces of the B second battery cells.

9. The battery of claim 7, wherein at least one of the B first battery cells has a different polarity arrangement of the first groups of external tabs than another one of the B first battery cells.

10. The battery of claim 1, wherein at least one of the first groups of external tabs has a width that is greater than or equal to 100 mm.

11. A vehicle, comprising:

the battery of claim 1;

an electric machine configured to propel the vehicle;

a power control system configured to control at least one of power to the battery from the electric machine and from the battery to the electric machine during at least one of charging, propulsion, and/or regeneration; and busbars connected to the first and second groups of external tabs and the power control system, wherein the temperature adjustment device is at least one of a heating manifold and a cooling manifold configured to cycle a heat exchange fluid through the central tunnel to at least one of heat and cool the battery during charging, propulsion, and/or regeneration.

* * * * *